United States Patent
McDonald et al.

[15] 3,689,809
[45] Sept. 5, 1972

[54] CAPACITOR BANK ARRANGEMENT

[72] Inventors: Jackie F. McDonald; William E. Midden, both of Springfield, Ill.

[73] Assignee: Sangamo Electric Company, Springfield, Ill.

[22] Filed: Oct. 19, 1971

[21] Appl. No.: 190,590

[52] U.S. Cl. .................... 317/256, 317/99, 317/242
[51] Int. Cl. .............................................. H01g 1/11
[58] Field of Search ............... 317/242, 99, 256, 247

[56] References Cited

UNITED STATES PATENTS

| | | |
|---|---|---|
| 2,722,634 | 11/1955 | Marbury .................... 317/242 |
| 3,254,270 | 5/1966 | Aungst ...................... 317/99 |
| 3,523,214 | 8/1970 | Beniaminson .............. 317/99 |

*Primary Examiner*—E. A. Goldberg

[57] ABSTRACT

A low profile capacitor bank arrangement wherein a frame structure supports a plurality of capacitors which have their high voltage and neutral terminals projecting inwardly of the frame structure for connection to bus bar means supported within the frame structure, the surface of the capacitors exposed exteriorly of the frame structure presenting a low outer profile and uncluttered appearance, and being safer through the elimination of the usual exteriorly projecting conductive elements.

13 Claims, 10 Drawing Figures

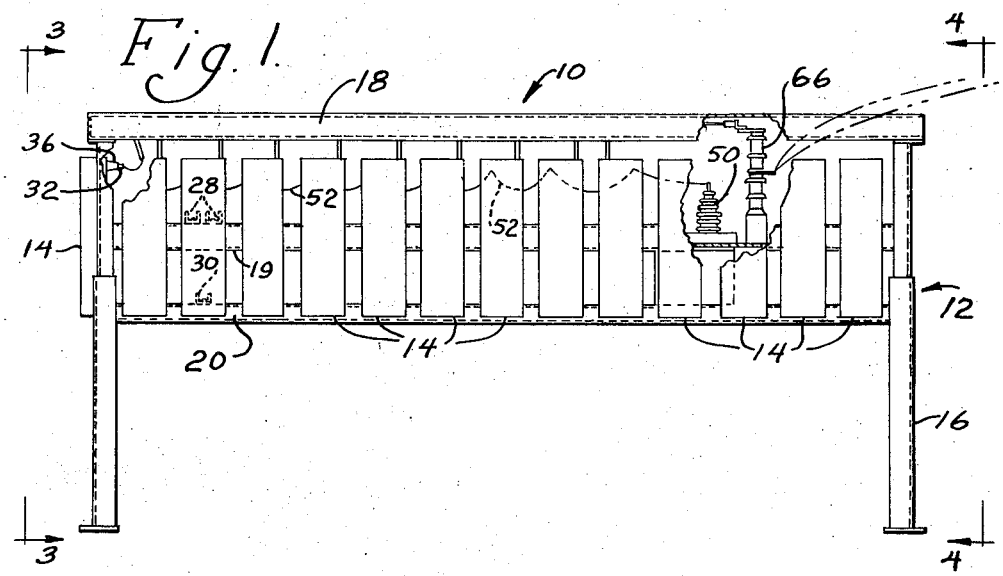
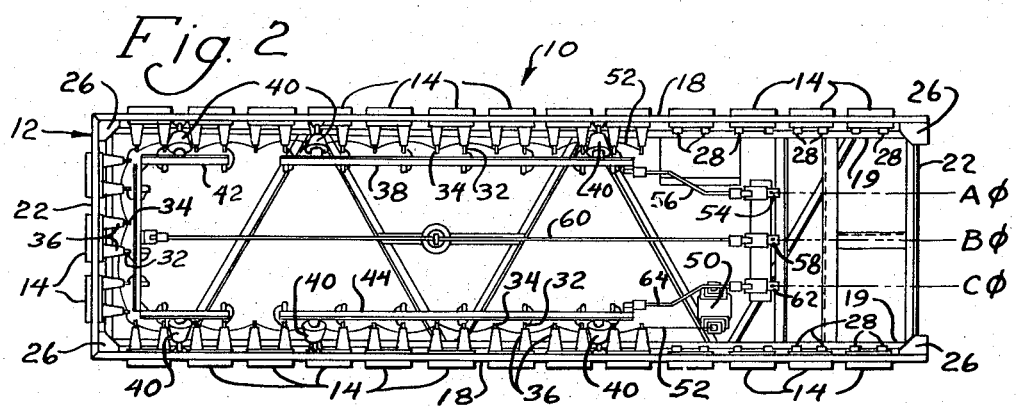
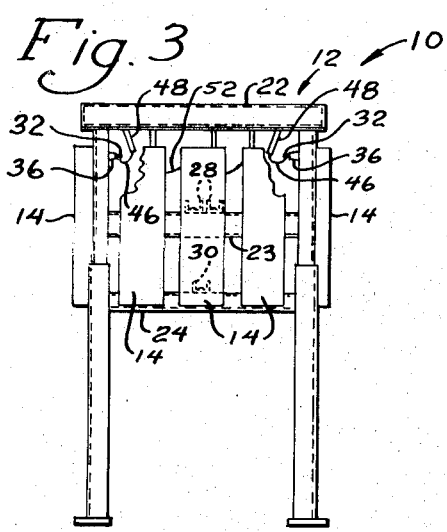
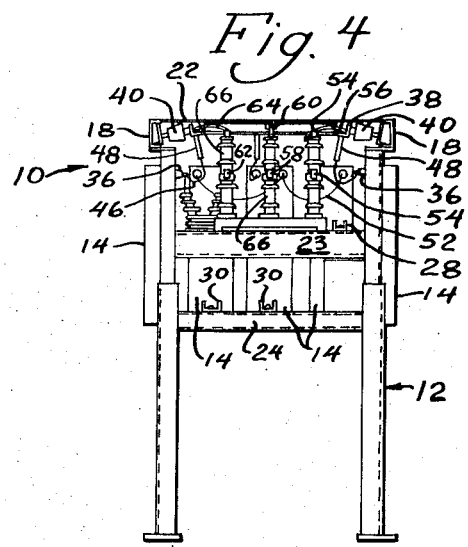

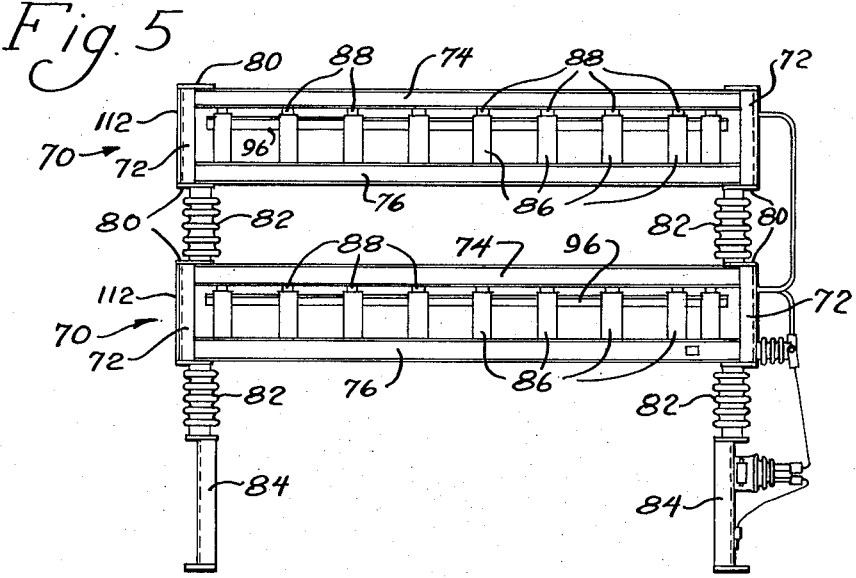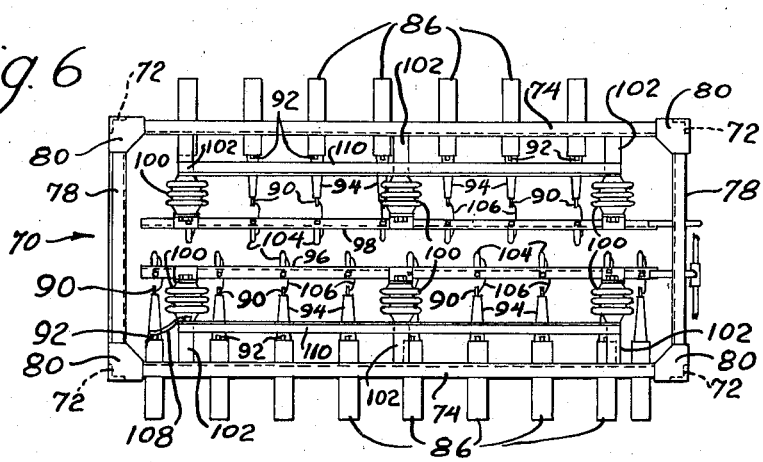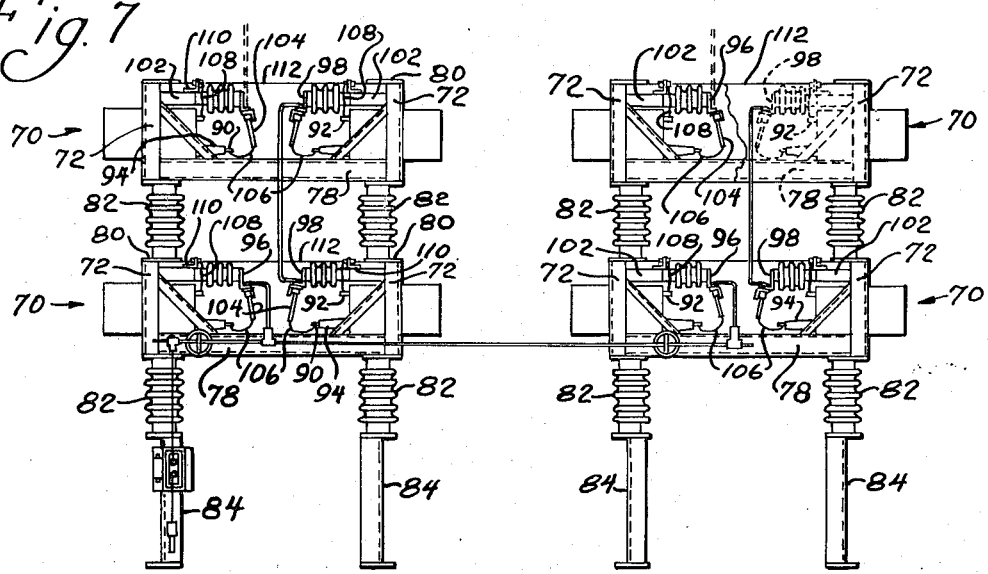

CAPACITOR BANK ARRANGEMENT

BACKGROUND OF THE INVENTION

The present invention relates generally to capacitor bank arrangements, and more particularly to such arrangements wherein the capacitors are supported with their terminals and associated conductive elements directed interiorly of a frame support structure so as to present a low uncluttered exterior profile, and provide a safer and more compact capacitor bank arrangement.

It is a common practice for utility companies to employ distribution substations to maintain desired system voltage levels and provide the kvar requirements of large industrial facilities. The substations generally comprise banks of individual capacitors which are suitably mounted and interconnected to provide the desired kvar requirements. The banks of generally rectangularly shaped capacitors have conventionally been supported on a frame structure with the terminals and associated bushings of the capacitors projecting outwardly from the vertical side surfaces of the capacitors or upwardly from the upper end surfaces thereof. These outwardly projecting capacitor terminals are connected through conductors and fuses to bus bars which are supported exteriorly of the frame structure for connection to the main power distribution lines. With such outwardly projecting elements, the known capacitor substations present a conspicuous and unattractive view for local residents. In addition, the outwardly projecting terminals and associated conductors and bus bars present a safety hazard to personnel in the area in that the elements may be accidentally touched, or fuse elements and gases may be expelled upon operation of a fuse. The outwardly projecting elements also are susceptible to damage by vehicles which can break off the elements upon accidental engagement therewith, and by objects that may be blown against the capacitor bank. There thus exists a need for a capacitor bank arrangement which when installed is substantially more inconspicuous, safer, and presents a lower compact exterior profile than the capacitor banks presently available.

SUMMARY OF THE INVENTION

One of the primary objects of the present invention is to provide a capacitor bank arrangement for use in power transmission substations and the like, the improved capacitor bank providing a substantially improved exterior appearance through a novel arrangement of components thereof.

Another object of the present invention is to provide a capacitor bank arrangement wherein the terminals and associated bushings of the several capacitors and the associated conductors and bus bars are supported interiorly of a box-like support frame structure in a manner to present a low profile, uncluttered outside appearance and thereby a less conspicuous substation.

Another object of the present invention is to provide a capacitor bank arrangement as described wherein the novel arrangement of elements of the several capacitors allows the capacitor bank to be installed in closer proximity to protective fences and the like than has heretofore been possible, and to provide a capacitor bank which is safer and less susceptible to damage of the elements thereof than the prior art capacitor banks.

Another object of the present invention is to provide a capacitor bank arrangement for use in power substations and the like wherein the terminals and bushings of the several capacitors and the associated conductors, fuses and bus bars are supported interiorly of an envelope defined by exterior generally planar surfaces of the capacitors and associated support frame structure.

In carrying out the objects and advantages of the present invention, there is provided a capacitor bank arrangement having a box-like support frame comprising a plurality of upstanding corner support members and horizontal frame members secured to and between the upstanding support members to present a substantially rectangular box-like frame structure. A plurality of generally rectangularly shaped capacitors are supported in a first embodiment with their major axes disposed vertically, the capacitors being secured to the horizontal frame members and having terminals projecting inwardly from the vertical inner surfaces of the several capacitors. The high voltage terminals of the capacitors are connected through conductors and fuse elements to bus bar means which are supported within the frame structure below the uppermost edges of the frame structure so as to be substantially inconspicuous when viewed from a position exteriorly of the capacitor bank. The neutral terminals of the several capacitors are connected to a neutral bus bar which is also supported interiorly of the frame structure such that after assembly, none of the conventional projecting elements of the capacitors or associated conductors extend outwardly of the envelope defined by the outer surfaces of the capacitors and frame structure, thereby being substantially hidden from exterior view. Utility specifications frequently require that the capacitor bushings be 8 feet 6 inches above the ground. In the present embodiment wherein the capacitor structures are vertically disposed and the terminals project inwardly from the inner surfaces of the capacitors adjacent the upper ends of the capacitor casings, the capacitors may be located well within the 8 feet 6 inch height requirement, and therefore a lower profile can be obtained.

A second embodiment supports the several rectangular shaped capacitors with their major axes disposed horizontally. The terminals of the horizontally disposed capacitors extend from the vertical end surfaces thereof interiorly of the frame structure and project inwardly for connection through fuse members to bus bars which, in turn, are supported interiorly of the frame structure. In the latter embodiment, no terminals or bus bar connectors project outwardly of, or are fully visible from, a position exterior to the capacitor bank installation.

Further objects and advantages of the present invention, together with the organization and manner of operation thereof, will become apparent from the following detailed description of preferred embodiments of the invention when taken in conjunction with the accompanying drawings wherein like reference numerals designate like elements throughout the several views.

BRIEF DESCRIPTION OF THE DRAWINGS

FIG. 1 is a side elevational view of a capacitor bank arrangement in accordance with one embodiment of the present invention, with portions of the frame structure and capacitors being broken away to better illustrate elements of the capacitor bank;

FIG. 2 is a top plan view of the capacitor bank arrangement of FIG. 1;

FIG. 3 is an end elevational view taken generally along the line 3—3 of FIG. 1 with portions being broken away to illustrate various of the elements of the capacitor bank;

FIG. 4 is a partial end elevational view taken generally along the line 4—4 of FIG. 1, looking in the direction of the arrows;

FIG. 5 is a side elevational view of a high voltage capacitor bank arrangement in accordance with another embodiment of the present invention, two racks of capacitors in series connections being illustrated in stacked relation;

FIG. 6 is a top plane view of the capacitor bank arrangement of FIG. 5;

FIG. 7 is an end elevational view illustrating capacitor banks in accordance with the second embodiment of the invention connected to comprise two banks of a three bank capacitor arrangement as in a three-phase installation;

DESCRIPTION OF PREFERRED EMBODIMENTS

Figure 8:
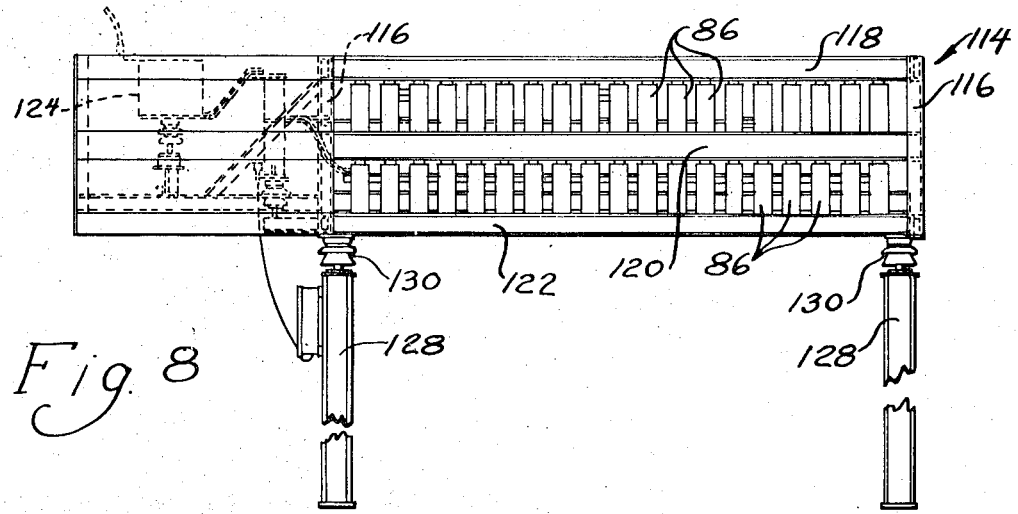
FIG. 8 is a side elevation view of a capacitor bank arrangement for a low voltage installation wherein all three phases of a three-phase installation are supported on a common frame structure.

Referring now to the drawings, and in particular to FIGS. 1-4, a capacitor bank arrangement in accordance with one embodiment of the present invention is indicated generally at 10. The capacitor bank arrangement 10 includes a box-like frame structure, indicated generally at 12 and a plurality of generally rectangular shaped capacitors 14 which are supported by the frame structure. The frame structure 12 includes a plurality of corner upright support members 16 made of suitable angle structural material to withstand outdoor usage, the structural strength of each of the selected corner uprights 16 being determined by the number of capacitors 14 to be supported thereby which, in turn, is determined by the particular kilovar rating for which the capacitor bank arrangement is designed. The upright support members 16 may each comprise two axially connected sections with the lower sections being of a length to maintain the capacitor bank at the desired height above the ground. The corner upright support members 16, there being four in the embodiment illustrated, are interconnected by upper, intermediate and lower horizontal frame members 18, 19 and 20 which define parallel sides of the box-like frame structure, and end upper, intermediate and lower frame members 22, 23 and 24 which are secured to and between the corner uprights 16 to defined opposite ends of the frame structure. The upper, intermediate and lower horizontal frame members 18, 19, 20, 22, 23 and 24 are preferably made of channel construction of suitable strength and material for outdoor usage. The upright support members 16 and horizontal interconnecting frame members 18, 19, 20, 22, 23 and 24 are rigidly secured together, as by welding, to provide a high-strength rigid box-like frame structure having a generally rectangular outer envelope. The respective upper, intermediate and lower horizontal frame members lie in common horizontal planes. Preferably, corner plates 26 are secured at the intersections of the upper side and end horizontal frame members to provide greater rigidity for the frame structure, as well as providing lifting guides for handling banks of capacitors.

Each of the capacitors 14 is of generally rectangular configuration, when considered in side profile as in FIG. 1, and is secured to and supported by the side and end intermediate and lower horizontal frame members 19, 20 and 23, 24 such that the major axis of each of the capacitors is disposed vertically on the frame structure. The capacitors 14 are of known construction and include outer metallic casings which hermetically seal the capacitor plates and a suitable dielectrica internally of the casings. The capacitor casings are secured to the associated intermediate and lower horizontal frame members through bracket means 28 and 30 secured to the inner vertical side surface of each of the capacitors at a suitable height for attachment to the frame members. Each of the capacitors 14 is supported such that its lower end surface is approximately even with the lower edge of the corresponding lower horizontal frame member 20 or 24, and its upper end surface is slightly below the corresponding upper horizontal frame member 18 or 22.

Each of the capacitors 14 has a pair of terminals 32, 34 which project generally horizontally from the inner vertical side surface of the capacitor adjacent the upper end thereof such that the terminals project inwardly of the box-like frame structure 12. The terminals 32 comprise high voltage terminals, and the terminals 34 comprise neutral terminals. Each of the terminals 32 and 34 has a suitable insulating porcelain bushing 36 thereon leaving only an outer end portion of each terminal exposed for connection to the associated high voltage or neutral bus. The high voltage terminal 32 of each of the capacitors 14 is connected to bus bar means supported interiorly of the frame structure 12. In the embodiment illustrated in FIGS. 1-4, a first bus bar 38 is supported by the upper horizontal frame member 18 on one side of the frame structure through suitable insulators 40, made of porcelain or other suitable material, the insulators being in turn secured to the inner surface of the corresponding horizontal frame member 18 such that the insulators 40 and supported bus bar 38 are disposed below the uppermost horizontal plane of the frame structure 12. Noting FIG. 2, the bus bar 38 is of a predetermined length for connection to the high voltage terminals of a selected number of the capacitors 14 representing one phase of the three phase system. A bus bar 42 is similarly supported through insulators 40 by the upper horizontal side frame members 18 adjacent the left-hand end of the frame structure 12 for connection to the high voltage terminals 32 of a predetermined number of the capacitors 14, the bus bar 42 and associated inculators 40 being similarly disposed below the horizontal plane of the upper surfaces of the horizontal frame members 18 and 20. A third bus bar 44 is similarly supported by and below the uppermost edge surface of the upper horizontal frame member 18 opposite the bus bar 38 through insulators 40 for connection to the high voltage terminals of another selected group of the capacitors 14. The high voltage terminals of the capacitors 14 are connected to the respective bus bars 38, 42 and 44 through conductive flipper straps 46 which have one end connected directly to the corresponding high voltage terminals 32 and have their opposite ends connected to the lower end of an expulsion fuse 48 which, in turn, has its upper end conductively connected to the corresponding bus bar. The conductive flipper straps 46 are assembled such that when connected to the lower ends of the associated expulsion fuses 48, the flipper straps are spring biased to effect quick and easy withdrawal of the lower end of the corresponding fuse element upon operation thereof to thereby disconnect the high voltage terminal of the associated capacitor from its conductive bus bar.

The neutral terminals 34 of the capacitors 14 are connected to reference potential means comprising, in the illustrated embodiment, a potential transformer 50 through a common conductor 52. The potential transformer 50 is supported interiorly of the frame structure 12 with the conductor 52 being similarly confined within the frame structure.

Noting FIG. 2, taken in conjunction with FIG. 4, the capacitors 14 of the illustrated capacitor bank arrangement 10 are connected for three-phase operation. To this end, the bus bar 38 is connected to a power line terminal 54 through a conductor 56 to comprise a phase A for connection to an incoming power line. The bus bar 42 is connected to a terminal 58 through a conductor 60 to establish a phase B connection to a second incoming power line. Similarly, the bus bar 44 is connected to a power terminal 62 through a conductor 64 to establish a phase C connection to a third incoming power line. The power terminals 54, 58 and 62 are supported by and are a part of, a vacuum switch 66 which in turn is mounted interiorly of the frame structure on a transverse frame member.

With the capacitors 14 supported on the outer surfaces of the horizontal intermediate and lower frame members with their outer vertical casing surfaces being exposed exteriorly of the frame structure and with their high voltage and neutral terminals 32 and 34 projecting inwardly of the frame structure for connection to interiorly supported bus bars as heretofore described, it can be seen that an uncluttered profile is presented to one viewing the capacitor bank 10 exteriorly therefrom. By mounting all of the conductive elements of the capacitor bank, such as the bus bars 38, 42 and 44 and their associated fuses 48 and conductive flipper straps 46, interiorly of the frame structure 12, these elements are protected from accidental damage from engagement by vehicles or other obstacles exterior of the capacitor bank as is possible with conventional capacitor bank arrangements wherein the conductive elements are supported to extend exteriorly of the capacitor bank. By supporting the conductive elements of the capacitor bank arrangement interiorly of the frame structure, the safety of personnel working in the area of the capacitor bank is substantially improved through prevention of accidental contact with the conductors by such personnel. Moreover, operation of one of the fuses 48 with resulting expulsion of the interior fuse elements through the action of the associated flipper strap 46 will not result in the expulsion links being accidentally discharged exteriorly of the capacitor bank where they could injure personnel adjacent the capacitor bank.

FIGS. 5-7 illustrate another embodiment of a capacitor bank arrangement in accordance with the present invention. The capacitor bank arrangement shown in FIGS. 5-7 provides for the mounting of generally rectangularly shaped capacitors with their major longitudinal axes disposed in substantially horizontal relation to provide a lower side profile or silhouette. The capacitor bank arrangement illustrated in FIGS. 5-7 is illustrated as including a plurality of vertically stacked capacitor racks, each of which is indicated generally at 70, the capacitor racks being selectively connected to provide the desired voltage and kilovar rating.

Each capacitor rack 70 includes a frame structure comprising upstanding corner support angle members 72, horizontal parallel upper and lower side frame members 74 and 76 secured to and between the corner support members, and horizontal end frame members 78 secured to and between the corner members so as to lie in the same general plane as the lower side frame members 76. The upstanding corner support members 72 and horizontal frame members 74, 76 and 78 are rigidly connected as by welding to define a generally rectangular shaped box-like frame structure. Preferably, corner plates 80 are welded to each of the upper and lower corners of the frame structure to provide greater rigidity as well as serving as mounting pads for supporting a selected number of capacitor racks 70 in stacked relation, there being two capacitor racks shown supported in vertical spaced relation in FIG. 5. To this end, high strength support insulators 82 are provided at each corner of the stacked capacitor racks and connected to the opposed corner plates 80 to electrically insulate the stacked capacitor racks from each other. The lowermost capacitor rack may be additionally spaced upwardly from the ground support surface through corner support legs 84 as is known.

As noted, each of the capacitor racks 70 includes a plurality of generally rectangularly shaped capacitors 86 which are supported with their major longitudinal axes disposed horizontally. The capacitors 86 are positioned in two opposing rows, one row on each side of the frame structure. The capacitors are supported by and between the upper and lower parallel spaced horizontal frame members 74 and 76 through suitable bracket means secured to the upper and lower frame members, the upper bracket means being indicated at 88 in FIG. 5. Each of the capacitors 86 is supported on an edge surface and has one high voltage and one neutral terminal 90 and 92, respectively, extending from the inner vertical end surfaces thereof in a direction inwardly of the frame structure. The high voltage terminals 90 extend inwardly from the inner end surfaces of the capacitors a distance substantially greater than the neutral terminals 92 and have insulator porcelain bushings 94 thereabout in similar fashion to the above-described bushings 36 on the high voltage terminals 32 of the capacitors 14.

The high voltage terminals 90 of the capacitors 86 are selectively connected to bus bars 96 and 98 which are supported on opposite sides of the frame structure through insulators 100, the insulators, in turn, being secured to the corresponding upper horizontal frame member through support brackets 102. The high voltage terminals 90 are connected to the associated bus bars 96 and 98 through suitable expulsion fuses 104 and conductive flipper springs 106 which are adapted to effect easy withdrawal of the corresponding fuse link upon operation of the fuse as is known.

The neutral terminals 92 of the capacitors 86 are connected through suitable conductors 108 to reference potential means comprising a pair of bus bars 110 supported by the associated support brackets 102 on opposite sides of the capacitor bank frame structure. The conductive bus bars 96 and 98, as well as the bus bars 110 are supported interiorly of the frame structure with the associated conductive flipper springs 106, fuses 104, and conductors 108 also being supported interiorly of the frame structure.

In the embodiment of capacitor banks shown in FIGS. 5–7, the upper and lower stacked capacitor racks 70 may be connected to similarly vertically stacked racks of capacitors mounted in generally side-by-side relation, two such stacks of capacitor banks being shown in FIG. 7. The stacked racks of capacitors shown in side-by-side relation in FIG. 7 are connected in a manner to provide a three-phase connection to input power lines, such connection being in accordance with known principles and, per se, forming no part of the present invention.

With the capacitor racks 70 as described, it will be seen that the ends of the capacitors 86 extending outwardly of the frame structure do not have any elements projecting outwardly therefrom and thereby present a relatively uncluttered appearance when viewed from a position exteriorly of the capacitor banks. The opposite ends of each rack of capacitors 86 may have decorative aluminum screening or translucent plates secured thereto, such as shown at 112, to hide the internally projecting conductors, fuses, bus bars and associated insulators and bushings. The capacitor bank arrangement of FIGS. 5–7 provides for greater safety through eliminating the conventional outwardly extending conductors and associated components, and reduces possible accidental damage to the elements from engagement by vehicles working in the substation area.

Figure 9:
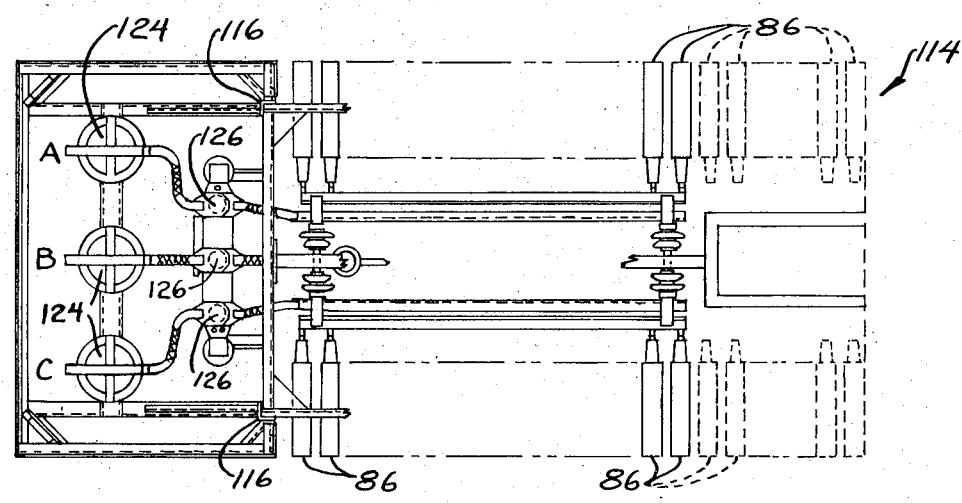
FIG. 9 is a top plan view of the capacitor bank of FIG. 8.
Figure 10:
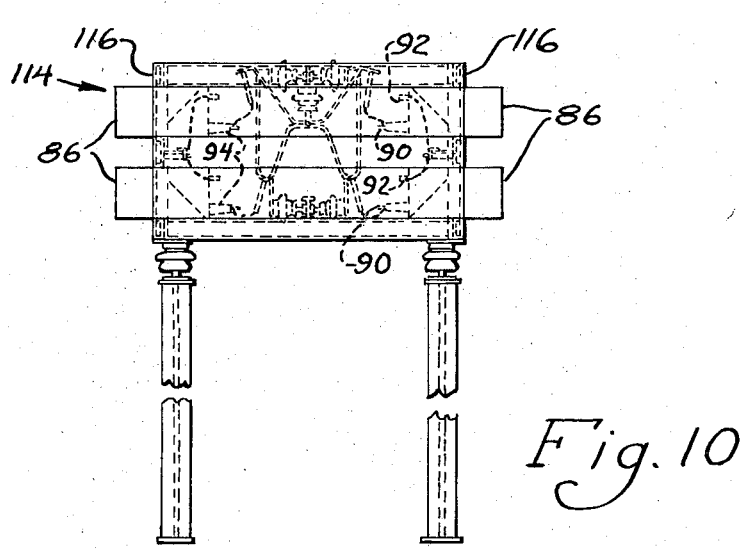
FIG. 10 is an end elevational view of the capacitor bank of FIG. 8.

In the capacitor bank arrangement shown in FIGS. 5–7, three individual capacitor banks are connected to achieve a three-phase assembly, each of the individual capacitor banks providing a different one of the three phases. The capacitor bank arrangement described with respect to FIGS. 5–7 is particularly well adapted for use in high-voltage installations, that is, for 15 KV or higher voltage installation. FIGS. 8–10 illustrate a modified capacitor bank arrangement, indicated generally at 114, wherein the capacitors are supported with their major axes in substantially horizontal position and wherein the capacitors in a single capacitor bank support structure are connected to provide all three phases of a three-phase installation. As there illustrated, two rows of generally rectangularly shaped capacitors 86 are supported in parallel spaced relation by a box-like frame structure comprising corner frame members 116 having upper, intermediate and lower horizontal spaced frame members 118, 120 and 122, respectively, secured to and between the corner frame members 116. The upper and lower rows of capacitors 86 are secuted to and between the spaced horizontal frame members 118, 120 and 122 such that their longitudinal axes are transverse to the longitudinal axes of the frame members.

Each of the capacitors 86 has a high voltage terminal and a ground or neutral terminal extending inwardly from the inner surface thereof such that the terminals are disposed inwardly of the box-like frame structure. The high voltage and neutral terminals of the capacitors 86 in the capacitor bank 114 are connected to bus bar means in the manner above described with respect to the capacitor rack arrangements 70 except that the capacitors 86 of the single capacitor bank 114 are selectively connected to provide three-phase operation. To this end, the upper and lower rows of capacitors on each side of the longitudinal axis of the capacitor bank arrangement 114 are connected such that selected ones of the capacitors have their high voltage terminals connected to a bus bar comprising a first phase A for connection to an incoming power line which is connected through a current limiting reactor 124 and through a vacuum switch 126 to the bus bar comprising phase A. Selected ones of the capacitors in the upper and lower rows on opposite sides of the capacitor bank arrangement 114 are connected to a common bus bar means to establish a second phase B for connection to a second incoming power line through a vacuum switch 126 and a current limiting reactor 124. Similarly, the remaining capacitors 86 of the upper and lower rows of capacitors opposite those connected to establish phase A are connected to establish a third phase C through a vacuum switch 126 and current limiting reactor 124. The neutral terminals of the capacitors 86 of the capacitor bank arrangement 114 are connected to the neutral bus.

The capacitor bank arrangement 114 may be supported at a desired vertical height above the ground through upstanding members 128 and associated support insulators 130. The current limiting reactors 124 and vacuum switches are suitably supported by frame members adjacent one end of the capacitor support frame and may be enclosed on the sides and end by aluminum screening secured to the frame structure to visually enclose these elements. With the capacitor bank arrangement 114 thus described, a compact low profile capacitor bank is provided wherein three-phase line connection is readily established within a single capacitor support structure, and outwardly extending protrusions of terminals, bus bars and fuse connections are eliminated to provide an uncluttered exterior appearance.

While preferred embodiments of my invention have been shown and described, it will be obvious to those skilled in the art that changes and modifications may be made therein without departing from the invention in its broader aspects.

We claim:

1. A capacitor bank arrangement comprising, in combination, frame means including a plurality of upstanding support members and a plurality of substantially horizontal frame members secured to and between said upstanding support members to define a box-like frame structure, a plurality of generally rectangularly shaped capacitors supported by said frame structure, each of said capacitors having terminal means projecting inwardly from a surface facing interiorly of said frame structure so that said terminal means project into the interior of said frame structure, bus bar means supported by said frame means within the envelope of said frame structure, and conductor means selectively connecting said terminal means to said bus bar means, said conductor means being disposed within said frame structure such that the capacitor bank presents a low uncluttered profile when viewed from a position exteriorly therefrom.

2. A capacitor bank arrangement as defined in claim 1 wherein each of said capacitors has a high voltage terminal and a neutral terminal projecting interiorly of said frame structure, and wherein said bus bar means comprise at least two bus bars supported on opposite sides of said frame structure, said conductor means selectively connecting said high voltage terminals to said bus bar means and connecting said neutral terminals to a neutral termination.

3. A capacitor bank arrangement as defined in claim 1 wherein said horizontal frame members include at least two vertically spaced parallel frame members secured to and between the upstanding support members on each side of said frame structure, and wherein selected of said capacitors are supported by said vertically spaced parallel frame members in spaced relation longitudinally therealong.

4. A capacitor bank arrangement as defined in claim 2 wherein said connector means connecting said high voltage terminals to said bus bar means include fuse means disposed between each high voltage terminal and the associated bus bar means.

5. A capacitor bank arrangement as defined in claim 1 wherein said rectangularly shaped capacitors are supported with their major longitudinal axes disposed substantially vertically, said capacitors being secured to said frame structure exteriorly thereof and each having high voltage and neutral terminals projecting inwardly of said frame structure from the capacitor side surface facing the interior of said frame structure.

6. A capacitor bank arrangement as defined in claim 5 wherein said horizontal frame members further include at least two vertically spaced parallel frame members defining an end of the frame structure, and wherein at least one capacitor is supported by said horizontal parallel end frame members with the major axis of the end capacitor being substantially vertical.

7. A capacitor bank arrangement as defined in claim 1 including a plurality of capacitors supported on at least three sides of said box-like frame structure, said capacitors having their major longitudinal axes disposed substantially vertically and each having high voltage and neutral terminals projecting inwardly of the frame structure, said bus bar means comprising three distinct bus bars each associated with selected ones of the capacitors supported along said end and sides of said frame structure, and conductor means connecting said bus bars in a manner to establish three-phase output from the capacitor bank arrangement.

8. A capacitor bank comprising, in combination, frame means including a plurality of upstanding support members and a plurality of substantially horizontal frame members secured to and between said upstanding support members to define a box-like frame structure, selected of said horizontal frame members being parallel and defining side portions of said frame structure with upper horizontal frame members being secured to said upstanding support members adjacent the upper ends thereof and lying in a common horizontal plane, a plurality of generally rectangularly shaped capacitors supported by said horizontal frame members with the major axes of the capacitors disposed in horizontal relation and with one of the end surfaces of each capacitor being directed inwardly of said box-like frame structure, each of said capacitors having a high voltage terminal and a neutral terminal extending from the end thereof directed inwardly of said frame structure, bus bar means supported by and inwardly of said upper horizontal frame members and being disposed below the uppermost horizontal plane of said upper frame members, conductor means disposed inwardly of said frame structure and connecting each of said high voltage terminals to said bus bar means, and conductor means connecting each of said neutral terminals to a common neutral termination.

9. A capacitor bank as defined in claim 8, including fuse means interconnecting each of the high voltage terminals of said capacitors with the associated bus bar means, said fuse means being disposed interiorly of said frame structure and said inward ends of said capacitors.

10. A capacitor bank as defined in claim 8, wherein said horizontal frame members defining side portions of said frame structure include at least two vertically spaced parallel frame members on each side of said frame structure, and wherein said capacitors are supported by and between said spaced parallel frame members on opposite sides of said frame structure, said capacitors being spaced longitudinally along said parallel frame members.

11. A capacitor bank as defined in claim 8, including mounting pad means secured to the upper corners of said box-like frame structure, said mounting pad means being adapted to have secured thereon a similar capacitor rack for substantially vertical stacking of a plurality of capacitor racks.

12. A capacitor bank as defined in claim 8, including protective plate means secured in vertical position to at least one end of said frame structure.

13. A capacitor bank as defined in claim 8, wherein said horizontal frame members on opposite sides of said box-like frame structure support upper and lower rows of capacitors, said capacitors being connected to establish three separate phases of a three-phase capacitor assembly.

* * * * *